(12) United States Patent
Jo et al.

(10) Patent No.: US 8,938,576 B2
(45) Date of Patent: Jan. 20, 2015

(54) DATA TRANSFER IN MEMORY CARD SYSTEM

(71) Applicants: Nam-phil Jo, Yongin-si (KR); Chang-il Son, Yongin-si (KR); Kyu-hyun Shim, Suwon-si (KR); Sin-ho Yang, Hwaseong-si (KR)

(72) Inventors: Nam-phil Jo, Yongin-si (KR); Chang-il Son, Yongin-si (KR); Kyu-hyun Shim, Suwon-si (KR); Sin-ho Yang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/469,704

(22) Filed: Aug. 27, 2014

(65) Prior Publication Data

US 2014/0365721 A1    Dec. 11, 2014

Related U.S. Application Data

(63) Continuation of application No. 13/857,147, filed on Apr. 5, 2013, now Pat. No. 8,856,433, which is a continuation of application No. 11/881,601, filed on Jul. 27, 2007, now Pat. No. 8,423,703.

(30) Foreign Application Priority Data

Aug. 7, 2006  (KR) ................... 2006-74291

(51) Int. Cl.
*G06F 12/00* (2006.01)
*G06F 13/00* (2006.01)
*G06F 13/28* (2006.01)
*G06F 3/00* (2006.01)
*G06F 12/02* (2006.01)
*G06F 3/06* (2006.01)
*G06F 1/12* (2006.01)

(52) U.S. Cl.
CPC .......... *G06F 12/0246* (2013.01); *G06F 3/0604* (2013.01); *G06F 3/0659* (2013.01); *G06F 3/0679* (2013.01); *G06F 1/12* (2013.01); *G06F 2003/0697* (2013.01)
USPC .............. 711/103; 711/115; 711/167; 710/13

(58) Field of Classification Search
None
See application file for complete search history.

(56) References Cited

U.S. PATENT DOCUMENTS

| | | | | |
|---|---|---|---|---|
| 5,548,741 | A * | 8/1996 | Watanabe | 711/115 |
| 6,134,638 | A * | 10/2000 | Olarig et al. | 711/167 |
| 6,594,727 | B1 * | 7/2003 | Tanaka | 711/115 |
| 6,778,454 | B2 * | 8/2004 | Duh et al. | 365/221 |
| 6,832,325 | B2 * | 12/2004 | Liu | 713/400 |
| 6,967,894 | B2 * | 11/2005 | Kondo | 365/185.17 |
| 7,171,529 | B2 * | 1/2007 | Ajiro | 711/157 |
| 7,330,949 | B2 * | 2/2008 | Takaragi et al. | 711/164 |
| 2002/0039325 | A1 * | 4/2002 | Aizawa | 365/233 |
| 2002/0087911 | A1 * | 7/2002 | Liu | 713/600 |
| 2002/0112119 | A1 * | 8/2002 | Halbert et al. | 711/115 |
| 2003/0090953 | A1 * | 5/2003 | Kawai et al. | 365/233 |
| 2005/0086409 | A1 * | 4/2005 | Grishaw et al. | 710/301 |
| 2005/0204091 | A1 * | 9/2005 | Kilbuck et al. | 711/103 |
| 2006/0022054 | A1 * | 2/2006 | Elhamias et al. | 235/492 |

(Continued)

*Primary Examiner* — Edward Dudek, Jr.
*Assistant Examiner* — Matthew Chrzanowski
(74) *Attorney, Agent, or Firm* — Monica H. Choi (57) ABSTRACT

A memory card system includes a host that issues a read command and a memory card that upon receiving the read command sends read data to the host in synchronism with a read clock signal generated within the memory card. In addition, the memory card sends the read clock signal to the host, and the host receives the read data in synchronism with the read clock signal, for increasing the allowable setup time period at the host.

20 Claims, 9 Drawing Sheets

(56) References Cited

U.S. PATENT DOCUMENTS

| | | | |
|---|---|---|---|
| 2006/0214009 A1* | 9/2006 | Shikata et al. | 235/492 |
| 2006/0230204 A1* | 10/2006 | Han et al. | 710/62 |
| 2007/0088906 A1* | 4/2007 | Mizushima et al. | 711/103 |
| 2008/0011851 A1* | 1/2008 | Adams et al. | 235/451 |
| 2009/0077393 A1* | 3/2009 | Nakamura | 713/310 |
| 2009/0106460 A1* | 4/2009 | Suenaga et al. | 710/13 |

* cited by examiner

DATA TRANSFER IN MEMORY CARD SYSTEM

CROSS-REFERENCE TO RELATED APPLICATION(S)

The present application is a continuation of an earlier filed copending patent application with Ser. No. 13/857,147 filed on Apr. 5, 2013, for which priority is claimed. This earlier filed copending patent application with Ser. No. 13/857,147 is in its entirety incorporated herewith by reference.

The copending patent application with Ser. No. 13/857,147 is in turn a continuation of an earlier filed patent application with Ser. No. 11/881,601 filed on Jul. 27, 2007, for which priority is claimed. This earlier filed patent application with Ser. No. 11/881,601 is in its entirety incorporated herewith by reference. This earlier filed patent application with Ser. No. 11/881,601 has now issued as U.S. Pat. No. 8,423,703 issued on Apr. 16, 2013.

The present application also claims priority under 35 USC §119 to Korean Patent Application No. 2006-74291, filed on Aug. 7, 2006, in the Korean Intellectual Property Office, the disclosure of which is incorporated herein in its entirety by reference. A certified copy of Korean Patent Application No. 2006-74291 is contained in the parent patent application with Ser. No. 11/881,601.

TECHNICAL FIELD

The present invention relates generally to memory card systems, and more particularly, to increasing allowable setup time at a host by transferring read data from a memory card to a host along with a read clock signal generated at the memory card.

BACKGROUND OF THE INVENTION

Figure 1:
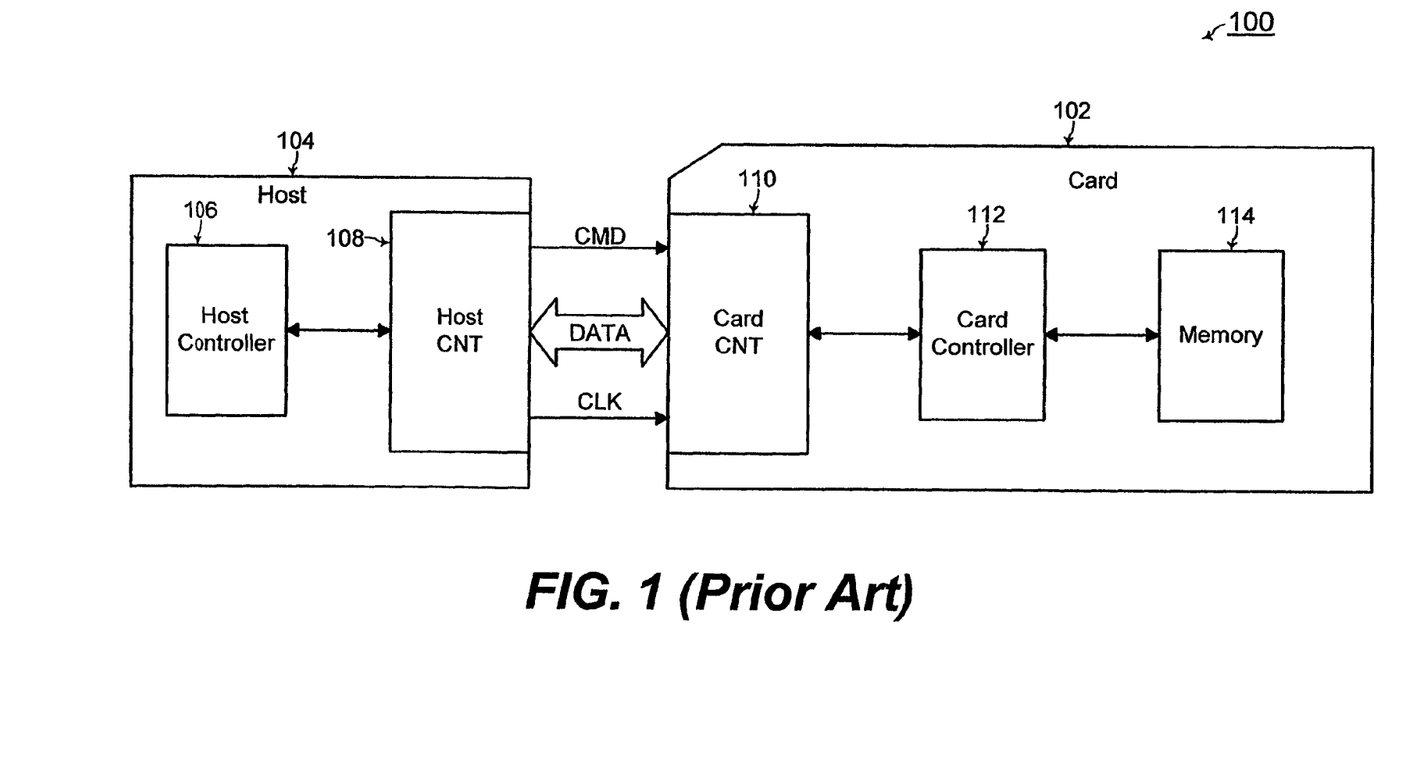
FIG. 1 shows a block diagram of a memory card system, according to the prior art.

FIG. 1 shows an example memory card system 100 of the prior art, including a memory card 102 and a host 104. The host 104 may be a portable electronic device such as a mobile phone, a MP3 player, or a PMP (portable media player). The memory card 102 may be a flash memory card as one example. The host 104 includes a host controller 106 and a host connection unit 108. The card 102 includes a card connection unit 110, a card controller 112, and a memory unit 114.

For writing data from the host 104 to the memory card 102, the host 104 sends a write command (WR_CMD), a clock signal CLK, and data to be written to the memory card 102 through the host connection unit 108. The memory card 102 receives the write command, the clock signal CLK, and the data through the card connection unit 110.

The card connection unit 110 receives the data from the host 104 in synchronism with the clock signal CLK from the host. The card controller 112 responds to the received write command by writing the received data into the memory unit 114 in synchronism with an internal clock signal generated by a clock signal generator within the card controller 112.

For reading of data from the memory card 102 by the host 104, the host 104 sends a read command (RD_CMD) and the clock signal CLK to the memory card 102 through the host connection unit 108. The memory card 102 receives the read command and the clock signal CLK through the card connection unit 110.

In the conventional memory card system 100, the host 104 generates and sends the clock signal CLK to be used by the memory card 110 for the write and read operations. Referring to the memory card system 100 in FIG. 2, the host 104 includes a host clock generator 116 for generating such a clock signal CLK.

Figure 2:
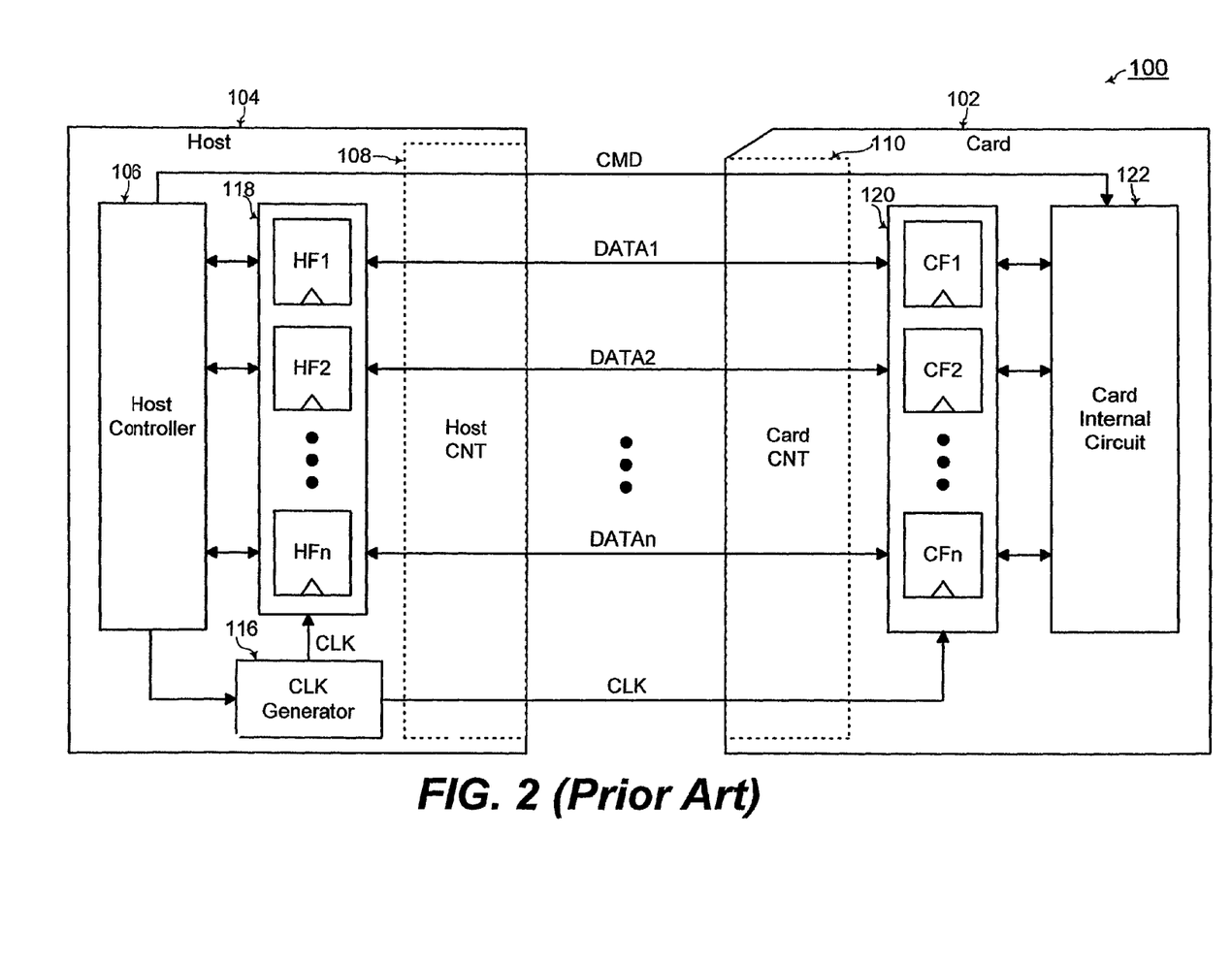
FIG. 2 shows the memory card system of FIG. 1 with I/O circuits clocked in a host and memory card, according to the prior art.

Further referring to FIG. 2, the host 104 includes a host I/O (input/output) circuit 118 having a plurality of data flip flops HF1, HF2, . . . , and HFn that are clocked with the clock signal CLK from the host clock generator 116. The memory card 102 includes a card I/O (input/output) circuit 120 having a plurality of data flip flops CF1, CF2, . . . , and CFn that are also clocked with the clock signal CLK from the host clock generator 116. A card internal circuit 122 illustrated in FIG. 2 includes the card controller 112 and the memory unit 114 of FIG. 1.

Figure 3:
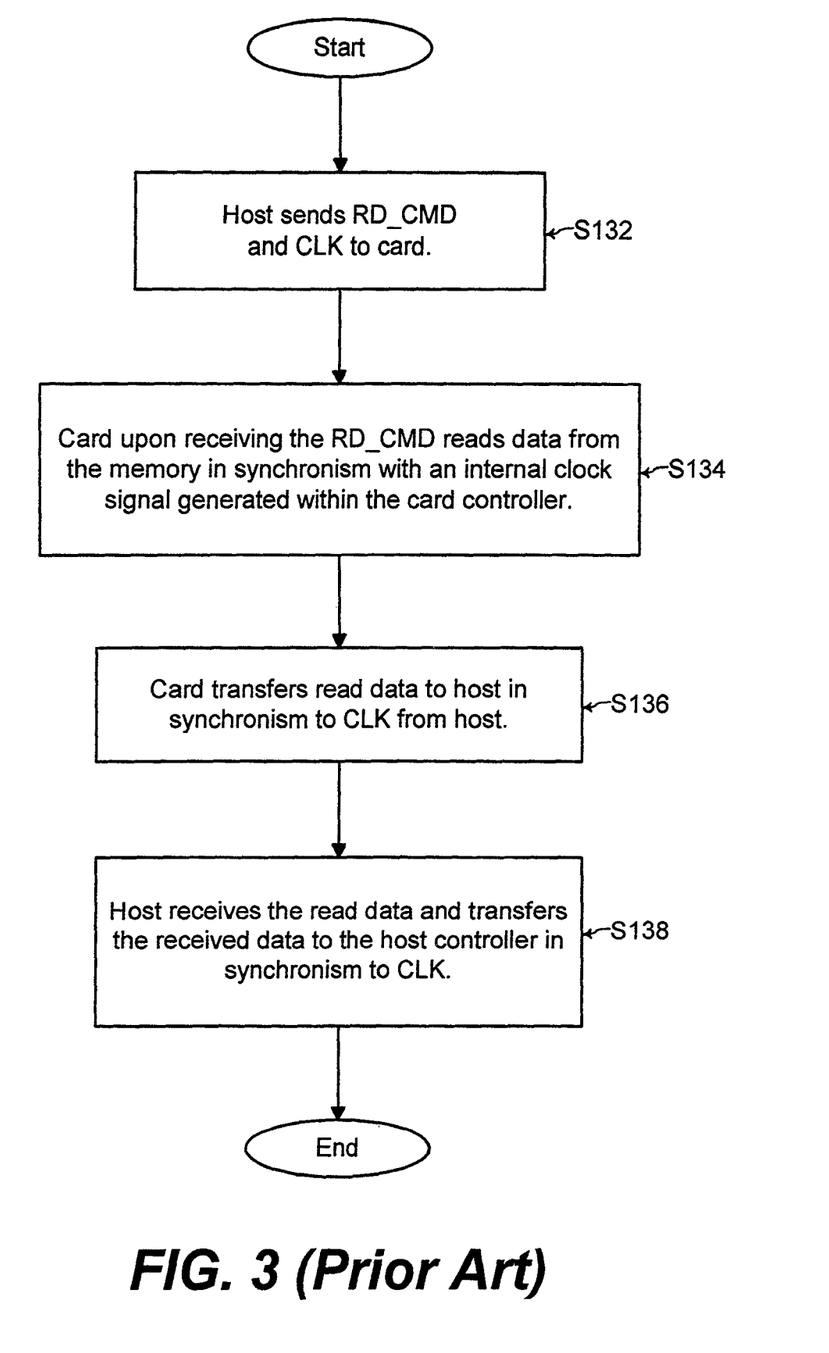
FIG. 3 shows a flow-chart of steps for a read operation in the memory card system of FIG. 2, according to the prior art.
Figure 4:
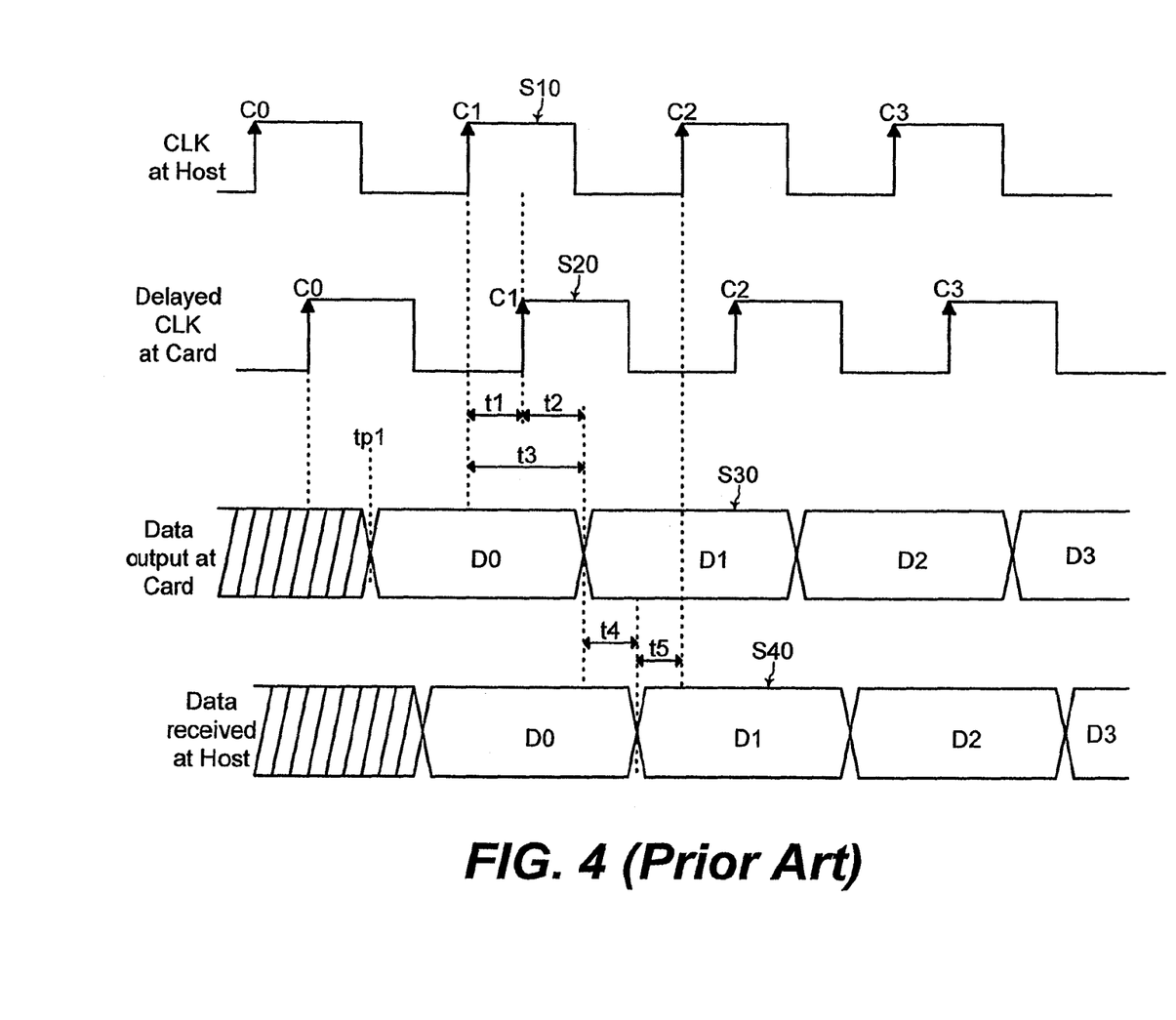
FIG. 4 shows a timing diagram of signals during a read operation in the memory card system of FIG. 2, according to the prior art.

FIG. 3 shows a flowchart of steps when the host 104 reads data from the memory card 102. FIG. 4 shows a timing diagram of signals when the host 104 reads data from the memory card 102.

Referring to FIGS. 2 and 3, the host generates and sends the read command (RD_CMD) and the clock signal CLK to the memory card 102 through the host connection unit 108 (step S132 of FIG. 3). The memory card 102 upon receiving the read command through the card connection unit 110 reads data from the memory unit 114 in synchronism with an internal clock signal generated within the card controller 112 (step S134 of FIG. 3).

The memory card 102 then transfers the read data back to the host 104 in synchronism with the clock signal CLK from the host 104 (step S136 of FIG. 3). In that case, the flip flops CF1, CF2, . . . , and CFn of the card I/O circuit 120 are clocked with the clock signal CLK from the host 104 for latching out such read data from the memory unit 114.

The host 104 receives and transfers such read data to the host controller 106 in synchronism to the clock signal CLK generated by the clock signal generator 116 at the host 104 (step S138 of FIG. 3). In that case, the flip flops HF1, HF2, . . . , and HFn of the host I/O circuit 118 are clocked with the clock signal CLK generated by the clock signal generator 116 at the host 104.

FIG. 4 shows a timing diagram of signals for the read operation within the memory card system 100 of FIG. 4. FIG. 4 shows the original CLK signal S10 generated by the clock signal generator 116 at the host 104. FIG. 4 also shows the transmitted CLK signal S20 received at the memory card 102 which is time delayed by time period t1 from the original CLK signal S10.

Additionally referring to FIG. 4, data S30 is output from the card I/O circuit 120 at a time delay t2 from the transmitted CLK signal S20 received at the memory card 102. The time delay t2 is a portion of the time period required for the memory controller 112 to retrieve the read data S30 from the memory 114 with respect to the received CLK signal S20 after receiving the read command. The total time delay t1+t2=t3 is also termed an output delay.

For example, the first data D0 begins to be generated at time point tp1 by the card controller 112 after the read command has been received by the controller 112 at a prior time. For example, the read command may have been received at the C0 transition of the CLK signal S20 received at the card 102. Thus, the data S30 is invalid (shown as shaded in FIG. 4) before the time point tp1.

Further referring to FIG. 4, data S40 is received at the host 104 with a bus delay t4 which is the time period required for transferring the data from the card 102 to the host 104. Once the data S40 arrives at the host connection unit 108, the host I/O circuit 118 has a maximum allowable setup time period t5 for transferring such data S40 to the host controller 106. The maximum allowable setup time period t5 is from the end of the time period t4 until the subsequent transition of the original clock signal CLK at the host 104 when the flip flops HF1, HF2, . . . , and HFn of the host I/O circuit 118 are controlled to latch the received data S40.

Thus, in the prior art, the maximum allowable setup time period t5 is limited by the output delay t3 and the bus delay t4. However, such allowable setup time period t5 may limit high frequency operation of the memory card system 100. Thus, a mechanism is desired for increasing the allowable setup time period t5 for faster speed performance of the memory card system.

SUMMARY OF THE INVENTION

Accordingly, in a general aspect of the present invention, the memory card generates and transmits a read clock signal when sending read data to the host for increasing the allowable setup time period at the host.

A memory card system according to a general aspect of the present invention includes a host that issues a read command and a memory card that upon receiving the read command sends read data to the host in synchronism with a read clock signal generated within the memory card. In addition, the memory card sends the read clock signal to the host, and the host receives the read data in synchronism with the received read clock signal.

In one embodiment of the present invention, the host includes at least one flip flop that latches in the read data from the memory card clocked with the read clock signal from the memory card.

In another embodiment of the present invention, the memory card includes at least one flip flop that latches out the read data to the host clocked with the read clock signal.

In an example embodiment of the present invention, the host includes a host data processor and a host memory device having sequences of instructions stored thereon. In that case, execution of the sequences of instructions by the host data processor causes the host data processor to perform the step of sending the read command to the memory card.

In another embodiment of the present invention, the memory card includes a read clock signal generator that is controlled to generate the read clock signal when the memory card receives the read command.

In another example embodiment of the present invention, the memory card includes a card data processor and a card memory device having sequences of instructions stored thereon. In that case, execution of the sequences of instructions by the card data processor causes the card data processor upon receiving the read command to perform the steps of:

reading the read data from a memory unit of the memory card in synchronism with an internal clock signal of the memory card;

controlling the read clock generator to generate the read clock signal to be sent to the host; and sending the read data and the read clock signal to the host.

In another aspect of the present invention, an allowable setup time for receiving the read data at the host is determined by a phase relationship between the read data and the read clock signal received at the host.

In a further embodiment of the present invention, the memory card includes a memory unit that receives another read command issued from a card controller of the memory card. In that case, the memory unit upon receiving the other read command provides the read data to the card controller in synchronism with another read clock signal generated within the memory unit. For example, the memory unit includes another read clock signal generator that is controlled to generate the other read clock signal when the memory unit receives the other read command. The memory unit is a flash memory in an example embodiment of the present invention.

In another embodiment of the present invention, the host transfers a write command, write data, and a write clock signal to the memory card. In that case, the memory card receives the write data in synchronism with the write clock signal.

In this manner, the read data and the read clock signal sent from the memory card arrive at the host with a substantially same time delay. In that case, the allowable setup time for receiving the read data at the host is determined by the phase relationship between the read data and the read clock signal received at the host. Thus, an output delay from the memory card is eliminated for increasing the allowable setup time at the host.

These and other features and advantages of the present invention will be better understood by considering the following detailed description of the invention which is presented with the attached drawings.

The figures referred to herein are drawn for clarity of illustration and are not necessarily drawn to scale. Elements having the same reference number in FIGS. 1, 2, 3, 4, 5, 6, 7, 8, 9, 10, and 11 refer to elements having similar structure and/or function.

DETAILED DESCRIPTION

Figure 5:
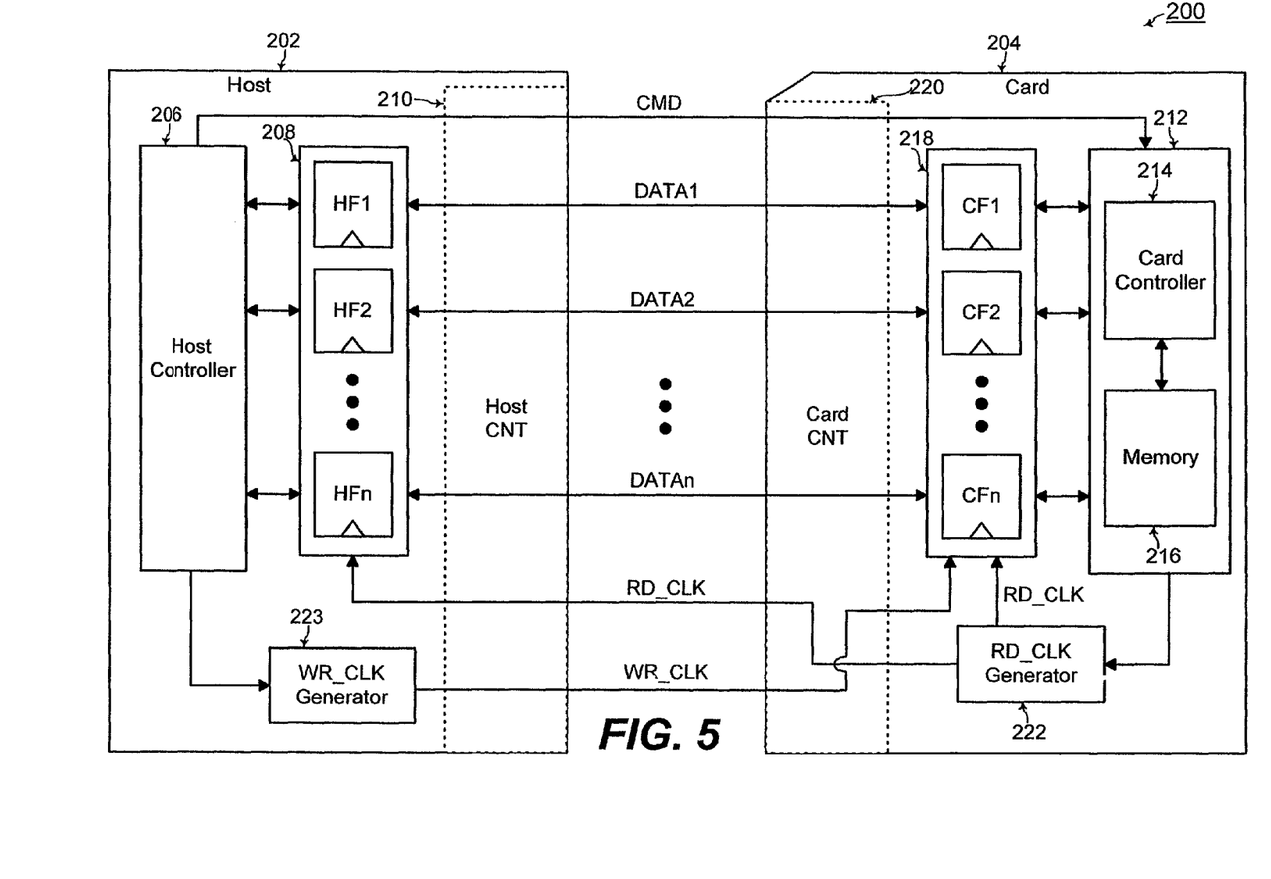
FIG. 5 shows a block diagram of a memory card system having a memory card generating a read clock signal, according to an embodiment of the present invention.

FIG. 5 shows a block diagram of a memory card system 200 having increased allowable setup time according to an embodiment of the present invention. The memory card system 200 includes a host 202 and a memory card 204.

The host 202 may be a portable electronic device such as a mobile phone, a MP3 player, or a PMP (portable media player), for example. The memory card 204 may be a smart card, a SIM (subscriber identification module) card, or a flash memory card, for example. The present invention may be practiced when the memory card 204 is any type of electronic card having read data accessed by the host 202 that is any electronic device having a coupling with such a memory card 204.

Figure 10:
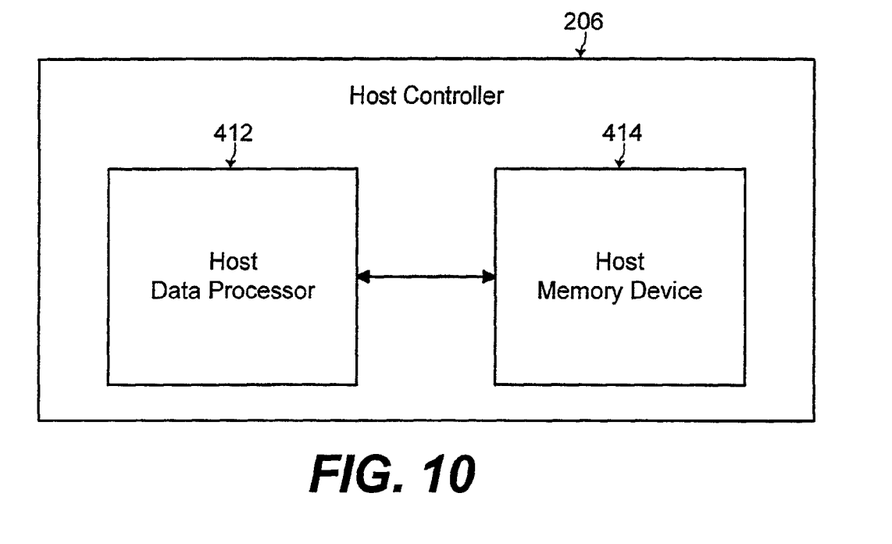
FIG. 10 illustrates a block diagram of an example host controller in the memory card system of FIG. 5, according to an embodiment of the present invention.

The host 202 includes a host controller 206, a host I/O circuit 208, a host connection unit 210, and a write clock signal generator 223. The host I/O circuit 208 includes a plurality of n data flip flops HF1, HF2, . . . , and HFn for latching data to/from the memory card 204. FIG. 10 shows an example embodiment of the host controller 206 including a host data processor 412 and a host memory device 414 having sequences of instructions (i.e., software) stored thereon. Execution of such sequences of instructions by the host data processor 412 causes the host data processor 412 to perform any function/process/step as described herein as being performed by the host controller 206.

The memory card 204 includes a card internal circuit comprised of a card controller 214 and a memory unit 216. The memory card 204 also includes a card I/O circuit 218, a card connection unit 220, and a read clock generator 222. The card I/O circuit 218 includes a plurality of n data flip flops CF1, CF2, . . . , and CFn for latching data to/from the host 202.

Figure 11:
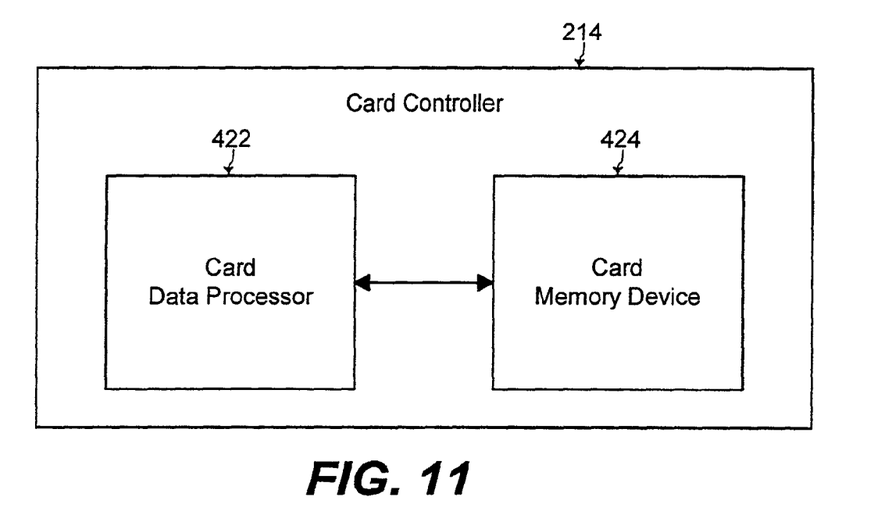
FIG. 11 illustrates a block diagram of an example card controller in the memory card system of FIG. 5, according to an embodiment of the present invention.

FIG. 11 shows an example embodiment of the card controller 214 including a card data processor 422 and a card memory device 424 having sequences of instructions (i.e., software) stored thereon. Execution of such sequences of instructions by the card data processor 422 causes the card data processor 412 to perform any function/process/step as described herein as being performed by the card controller 214.

Figure 6:
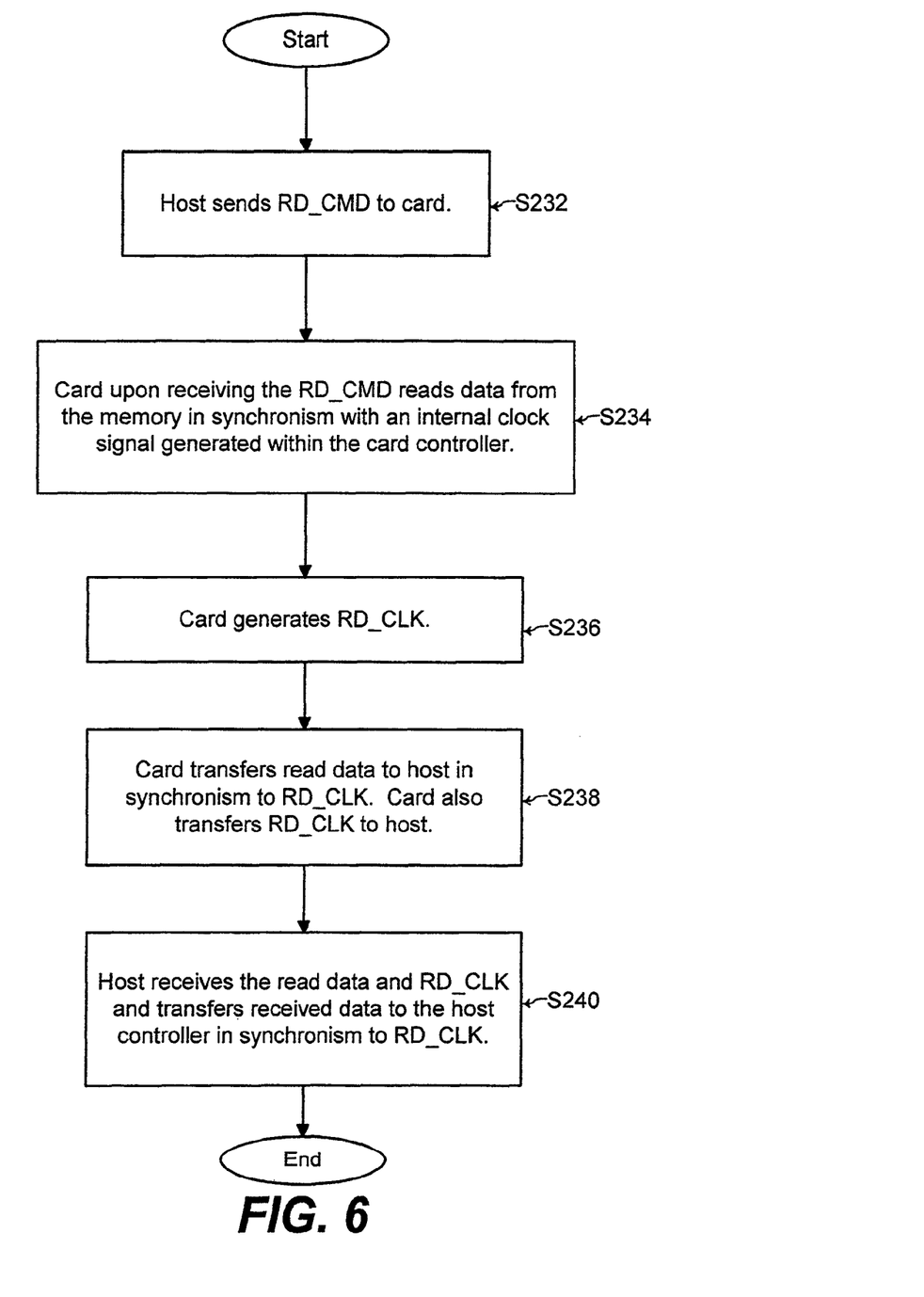
FIG. 6 shows a flow-chart of steps during a read operation within the memory card system of FIG. 5, according to an embodiment of the present invention.

FIG. 6 shows a flow-chart of steps during a read operation of the memory card system 200 of FIG. 5, in an example embodiment of the present invention. Referring to FIGS. 5 and 6, the host controller 206 generates a read command RD_CMD sent to the memory card 204 through the host connection unit 210 (step S232 of FIG. 6).

The card controller 214 upon receiving the read command RD_CMD reads data from the memory unit 216 in synchronism with an internal clock signal generated within the card controller 214 (step S234 of FIG. 6). In addition, the card controller 214 upon receiving the read command RD_CMD controls the read clock generator 222 to generate a read clock signal RD_CLK (step S236 of FIG. 6).

Subsequently, the memory card 204 transfers the read data generated by the card controller 214 from the memory unit 216 to the host 202 in synchronism with the read clock signal RD_CLK from the read clock generator 222 (step S238 of FIG. 6). To that end, the data flip flops CF1, CF2, . . . , and CFn in the card I/O circuit 218 are clocked with the read clock signal RD_CLK from the read clock generator 222 for latching such read data to the host 202 through the card connection unit 220.

In addition, the memory card 204 also transfers the read clock signal RD_CLK from the read clock generator 222 to the host 202 through the card connection unit 220 (step S238 of FIG. 6). The host 202 receives the read data and the read clock signal RD_CLK through the host connection unit 210 (step S240 of FIG. 6). The host I/O circuit 208 transfers such read data to the host controller 206 in synchronism with the received RD_CLK signal (step S240 of FIG. 6).

Figure 7:
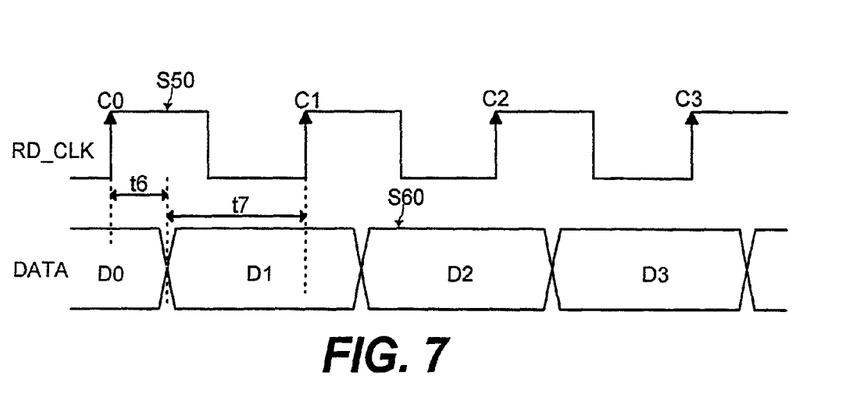
FIG. 7 shows a timing diagram of signals during a read operation within the memory card system of FIG. 5, according to an embodiment of the present invention.

To that end, the data flip flops HF1, HF2, . . . , and HFn in the host I/O circuit 208 are clocked with the read clock signal RD_CLK received from the memory card 204 for latching such read data to the host controller 206 from the host connection unit 210. FIG. 7 illustrates a timing diagram of the read clock signal RD_CLK S50 and the read data S60 received at the host connection unit 210.

Referring to FIG. 7, the read clock signal RD_CLK S50 and the read data S60 are received at the host connection unit 210 with a transfer delay t6 between such signals S50 and S60. Such a transfer delay t6 may arise from the different signal paths for such signals S50 and S60. For example, the data path for the read data S60 may have a pad associated with a higher delay than the pad for the read clock signal RD_CLK S50. Alternatively, the data path for the read data S60 may be longer with higher time delay than the data path for the read clock signal RD_CLK S50.

In any case, a maximum allowable setup time t7 for the host I/O circuit 208 to transfer the read data S60 to the host controller 206 is from the end of the time delay t6 to the subsequent transition (i.e., C1 in FIG. 7) of the received read clock signal RD_CLK S50 when the flip flops HF1, HF2, . . . , and HFn latch the read data S60. Such a maximum allowable setup time t7 in FIG. 7 is advantageously longer than the maximum allowable setup time t5 in the prior art of FIG. 4.

The reason for such an increased maximum allowable setup time t7 in FIG. 7 is that the output delay $t3=t1+t2$ is eliminated with the memory card system 200 of FIG. 5 with the read clock signal RD_CLK being generated and transmitted from the memory card 202 for clocking the host I/O circuit 208. Such an increased maximum allowable setup time t7 in FIG. 7 is advantageous for increasing the operating frequency of the memory card system 200 according to an aspect of the present invention.

In addition, the read clock signal RD_CLK from the read clock generator 222 is transferred to the host 202 substantially only during a read operation when read data is also being transferred to the host 202 in one embodiment of the present invention. The card connection unit 220 may determine the time duration for sending such read data and read clock signal RD_CLK from an estimation of the size of the read data to be sent to the host 202. Alternatively, the host 202 may send an acknowledge command back to the card connection unit 220 indicating when all of the desired read data has been received by the host 202.

Figure 8:
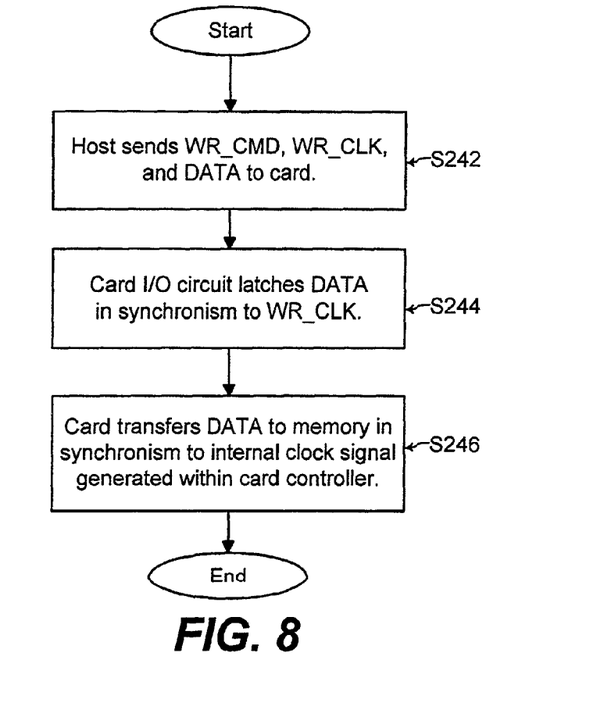
FIG. 8 shows a flow-chart of steps during a write operation within the memory card system of FIG. 5, according to an embodiment of the present invention.

FIG. 8 shows a flow-chart of steps performed by the memory card system 200 of FIG. 5 for a write operation. Referring to FIGS. 5 and 8, the host 202 sends a write command WR_CMD, a write clock signal WR_CLK, and write data to be written to the memory card 204 through the host connection unit 210 (step S242 of FIG. 8). To that end, the host 202 includes a write clock signal generator 223 for generating the write clock signal WR_CLK.

Further referring to FIGS. 5 and 8, the data flip flops CF1, CF2, . . . , and CFn of the card I/O circuit 218 latch such write data received at the card connection unit 220 in synchronism to the write clock signal WR_CLK received at the card connection unit 220 (step S244 of FIG. 8). In addition, the card controller 214 receives such latched write data from the card I/O circuit 218 and writes the latched write data into the memory unit 216 in synchronism with an internal clock signal generated within the card controller 214 (step S246 of FIG. 8).

Figure 9:
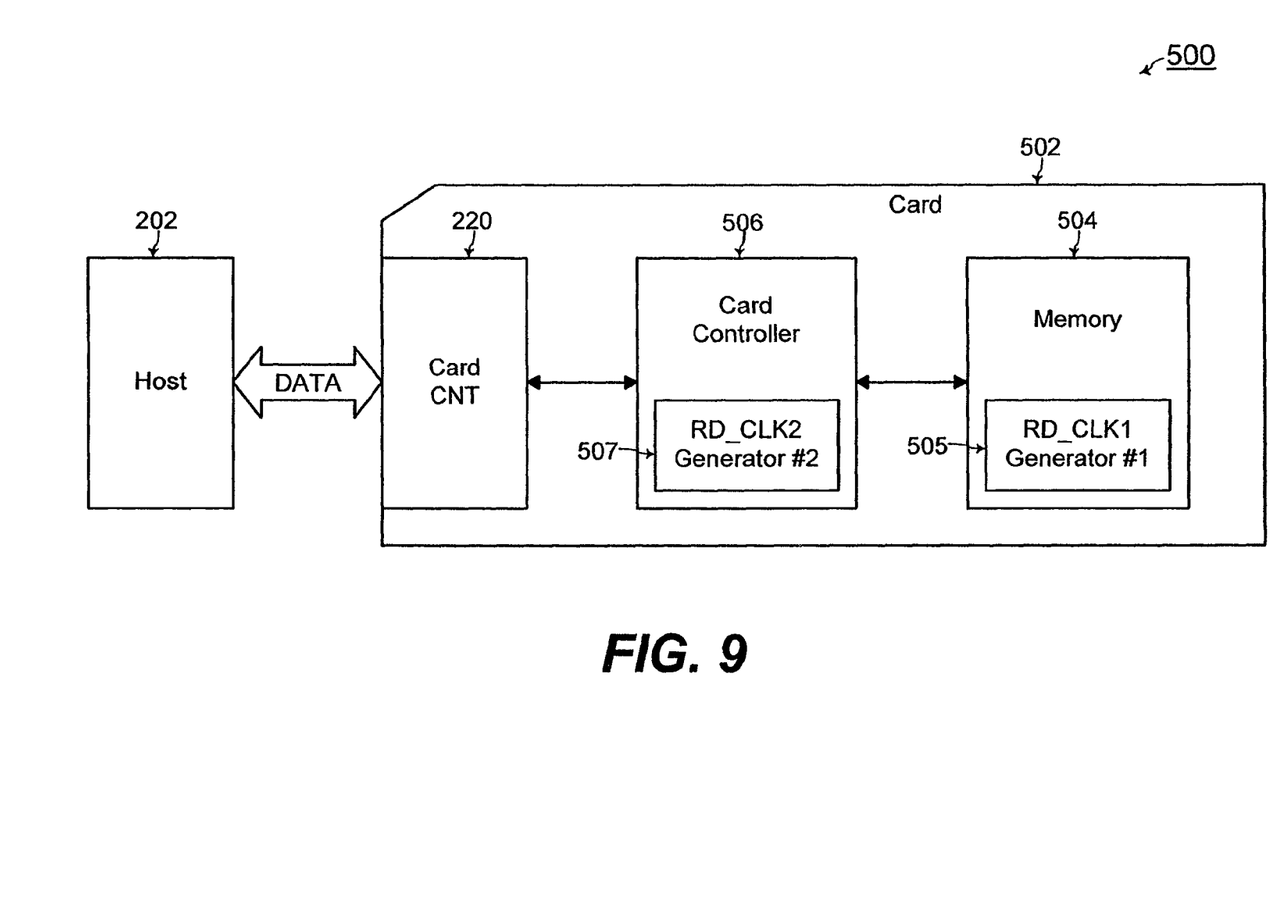
FIG. 9 shows a block diagram of a memory card system having a card controller and a memory unit with respective read clock signal generators, according to another embodiment of the present invention.

FIG. 9 shows a memory card system 500 according to an alternative embodiment of the present invention. Elements having the same reference number in FIGS. 5 and 11 refer to elements having similar structure and/or function. The memory card system 500 of FIG. 9 has a memory card 502 with a memory unit 504 including a first read clock signal generator 505 and with a card controller 506 having a second read clock signal generator 507.

When the memory unit 504 is transferring read data to the card controller 506, the memory unit 504 also transfers a first read clock signal RD_CLK1 from the first read clock signal generator 505 to the card controller 506. Thus, the card controller 506 and the memory unit 504 of FIG. 9 operate similarly for any read operation as already described between the host 202 and the card 204, respectively, for FIG. 5.

Similarly, when the card controller 506 is transferring read data to the card connection unit 220, the card controller 506 also transfers a second read clock signal RD_CLK2 from the second read clock signal generator 507 to the card connection unit 220. Thus, the card connection unit 220 and the card controller 506 of FIG. 9 operate similarly for any read operation as already described between the host 202 and the card 204, respectively, for FIG. 5.

The foregoing is by way of example only and is not intended to be limiting. For example, any number of elements as illustrated and described herein is by way of example. The present invention is limited only as defined in the following claims and equivalents thereof.

The invention claimed is:

1. A memory system, comprising:
  a memory unit including at least one nonvolatile memory and configured to output a read data and a first read clock signal in response to a first read command; and
  a memory controller configured to send the first read command to the memory unit in response to a second read command received from an external device, to receive the read data and the first read clock signal from the memory unit in synchronism with each other, to generate a second read clock signal, and to send the received read data and the second read clock signal to the external device in synchronism with each other,
  wherein the first clock signal is transferred to the memory controller while the read data is being outputted to the memory controller, and wherein the second read clock signal is transferred to the external device while the received data is being outputted to the external device.

2. The memory system of claim 1, wherein the first read clock is not outputted to the memory controller except for the first read operation.

3. The memory system of claim 2, wherein the second read clock is not outputted to the external device except for the second read command.

4. The memory system of claim 1, wherein the memory controller includes a data processor and a memory device having sequences of instructions stored thereon, and wherein execution of the sequences of instructions by the data processor causes the memory controller upon receiving the second read request from the external device to perform the steps of:
  receiving the read data from the memory unit in synchronism with the first read clock signal;
  generating the second read clock signal to be sent to the external device; and
  sending the read data and the second read clock signal to the external device.

5. The memory system of claim 1, wherein the memory controller is further configured to receive write data in synchronization with a clock signal from the external device.

6. The memory system of claim 1, wherein the at least one nonvolatile memory is a NAND flash memory, and wherein the memory system is a memory card.

7. A method for transferring data in a memory system including a memory unit and a memory controller for controlling the memory unit, comprising:
  receiving a read command from an external device that is external to the memory system, at the memory controller;
  receiving read data and a first read clock signal from the memory unit in response to the read command, at the memory controller, the read data being synchronized with the first read clock signal;
  generating a second read clock signal at the memory controller; and
  outputting the received read data and the second read clock signal to the external device from the memory controller, wherein the received read data is outputted in synchronization with the second clock signal,
  and wherein the first clock signal is transferred to the memory controller while the read data is being outputted to the memory controller, and wherein the second read clock signal is transferred to the external device while the received data is being outputted to the external device.

8. The method of claim 7, wherein the first read clock is not outputted to the memory controller except for the first read operation.

9. The method of claim 7, wherein the second read clock is not outputted to the external host except for the second read command.

10. An electronic device, comprising:
  a host for issuing a read command; and
  a memory system for outputting read data in response to the read command, wherein the memory system includes,
  a memory unit including at least one nonvolatile memory and configured to output the read data and the first read clock signal in response to a first read command; and
  a memory controller configured to send the first read command to the memory unit in response to the read command received from the host, to receive the read data and the first read clock signal from the memory unit in synchronism with each other, to generate a second read clock signal, and to send the received read data and the second read clock signal to the host in synchronism with each other,
  wherein the first clock signal is transferred to the memory controller while the read data is being outputted to the memory controller, and wherein the second read clock signal is transferred to the host while the received data is being outputted to the host.

11. The electronic device of claim 10, wherein the host is a portable electronic device.

12. The electronic device of claim 10, wherein the host sends an original clock signal for generating the second read clock.

13. The electronic device of claim 12, wherein the memory controller generates the second read clock by delaying the original clock signal.

14. The electronic device of claim 12, wherein the memory controller uses the first read clock signal as an internal clock signal.

15. The electronic device of claim 12, wherein the original clock signal is transferred to the memory controller through a first line, and wherein the second read clock signal is transferred to the host through a second line.

16. The electronic device of claim 10, wherein the host outputs write data in synchronization with a write clock signal to the memory system.

17. The electronic device of claim 10, wherein the host includes a clock signal generator for generating the write clock signal.

18. The electronic device of claim 10, wherein the host communicates with the memory system through a plurality of data lines and at least one clock line.

19. The electronic device of claim 10, wherein the read command is transferred to the memory system through a command line.

20. The electronic device of claim 10, wherein the host includes a data processor to execute sequences of instructions stored in a memory device.

* * * * *